United States Patent [19]

Eales

[11] Patent Number: 5,135,823
[45] Date of Patent: Aug. 4, 1992

[54] MODULAR MULTI-COMPARTMENT BLOW MOLDED CONTAINER

[76] Inventor: George E. Eales, 527 W. Olive Ave., Redlands, Calif. 92373

[21] Appl. No.: 621,286

[22] Filed: Nov. 30, 1990

Related U.S. Application Data

[63] Continuation-in-part of Ser. No. 578,551, Sep. 4, 1990.

[51] Int. Cl.$^5$ .......................... H01M 6/42; B65D 1/04
[52] U.S. Cl. ..................................... 429/156; 429/158; 429/176; 215/6; 220/23.4; 220/23.6; 220/23.83
[58] Field of Search ....................... 429/158, 176, 156; 215/6; 220/23.4, 23.83, 23.6

[56] References Cited

U.S. PATENT DOCUMENTS

| | | |
|---|---|---|
| D. 192,980 | 6/1962 | Mangini et al. |
| D. 194,165 | 11/1962 | Riley et al. |
| D. 214,549 | 7/1969 | Ledewitz |
| D. 227,551 | 7/1973 | Crutchfield |
| D. 244,992 | 7/1977 | Van der Veken |
| D. 263,118 | 2/1982 | Weckman |
| D. 280,599 | 9/1985 | Green |
| 3,397,086 | 8/1968 | Sasagawa et al. ............ 429/176 |
| 3,650,841 | 3/1972 | Brindley |
| 3,673,302 | 6/1972 | Halsall et al. |
| 3,836,401 | 9/1974 | HansNiklas et al. ............ 429/158 |
| 4,196,808 | 4/1980 | Pardo |
| 4,239,839 | 12/1980 | McDowall et al. |
| 4,264,295 | 4/1981 | Hingley |
| 4,381,841 | 5/1983 | Schwarz ...................... 220/23.4 |
| 4,429,786 | 2/1984 | Hucal ........................... 215/6 |
| 4,656,840 | 4/1987 | Loofbourrow et al. ............ 220/23.4 |

FOREIGN PATENT DOCUMENTS

| | | | |
|---|---|---|---|
| 0065349 | 11/1982 | European Pat. Off. | ............ 429/71 |
| 2422262 | 4/1978 | France | ............ 429/158 |

OTHER PUBLICATIONS

"Out of Sight" advertisement; Coty, N.Y.; 1 p.; 1990.
"Delco Dura Power Batteries" catalog sheets; Delco Remy, Anderson, IN. 2 pp.; no date.
"Auto Batteries" article; Consumer Reports; p. 94; Feb. 1985.
"Injection Molding Handbook" by D. Rosato et al.; title page and pp. v, 760–769; 1986.
"Plastics Engineering Handbook of the Society of the Plastics Industry", title pages and pp. 404–407, 1976.

Primary Examiner—Asok Pal
Assistant Examiner—C. Everhart
Attorney, Agent, or Firm—Sheldon & Mak

[57] ABSTRACT

Disclosed are blow molded multiple compartment plastic containers in one configuration having partition members between the compartments that initially form portions of a mold for the container. When molding is complete, the partition members form part of the container, with the molded plastic material of the container substantially surrounding the partition members. In another configuration the containers are modular, mating engagement members being formed in facing walls of separate container portions that are joined subsequent to molding. In this configuration, the container portions can be made detachable or permanently attached. Also disclosed are methods for molding the containers.

34 Claims, 7 Drawing Sheets

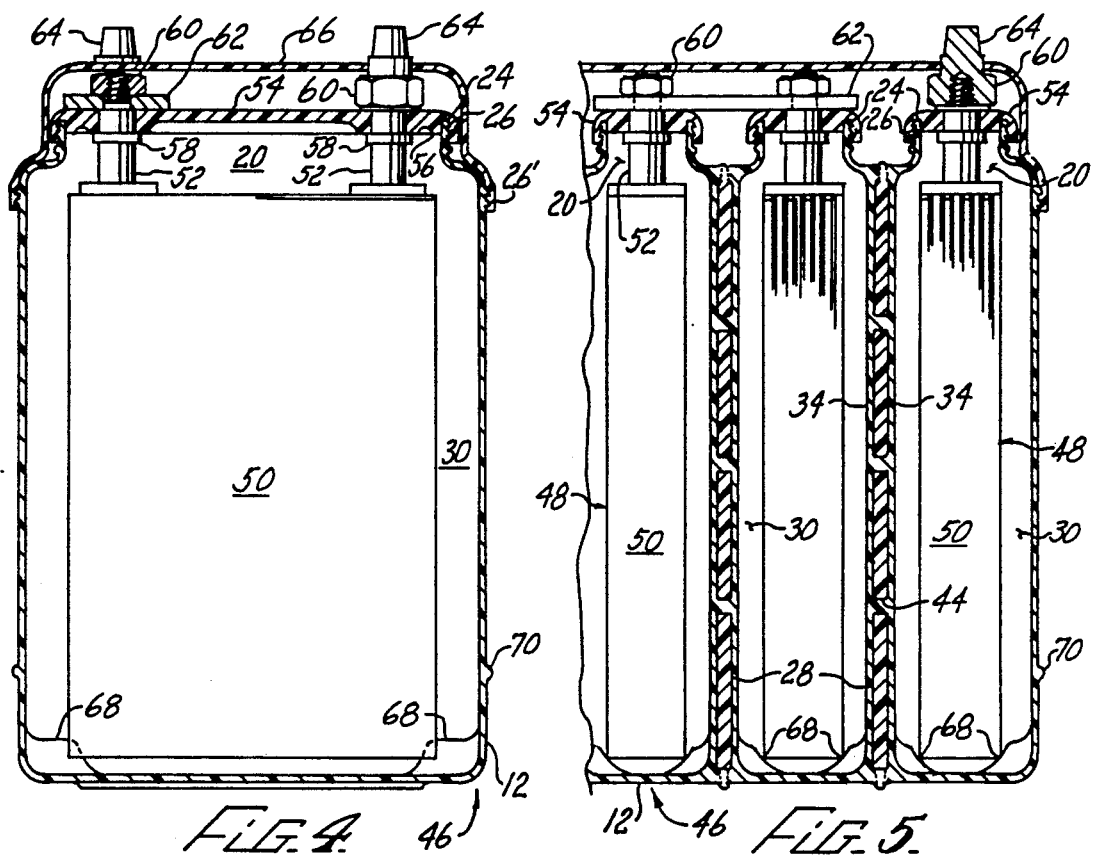

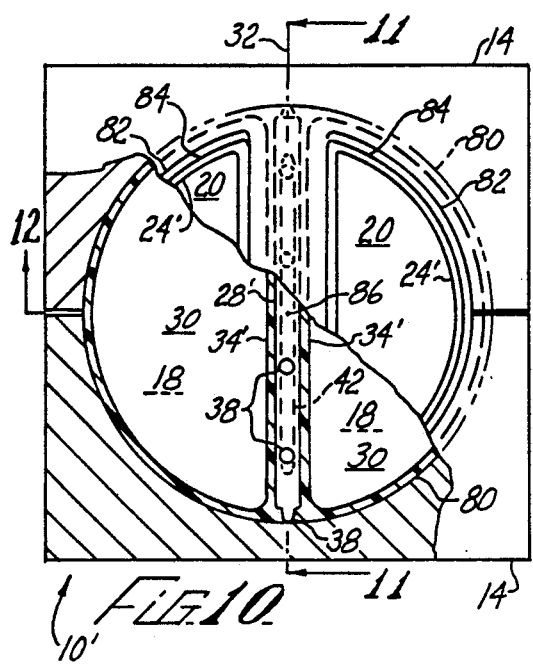
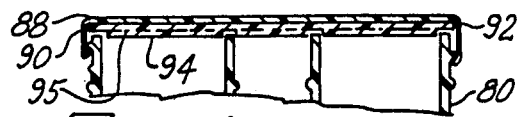
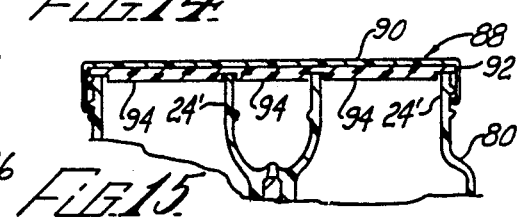
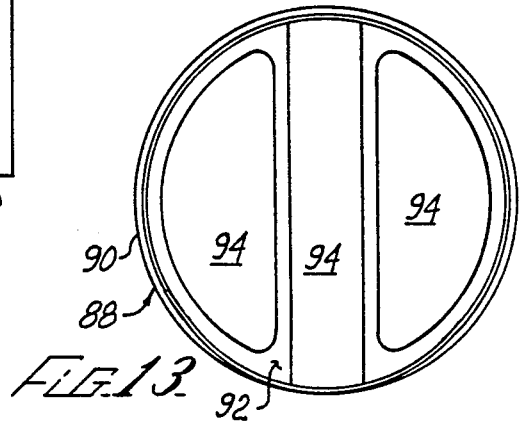
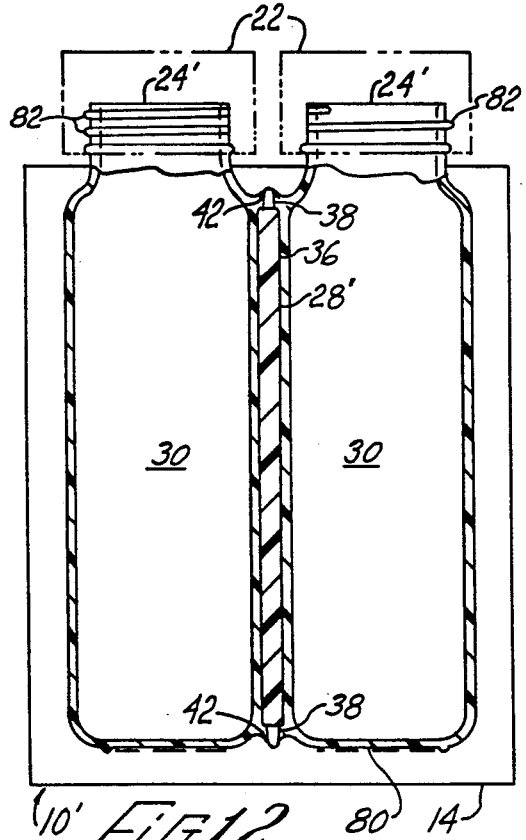
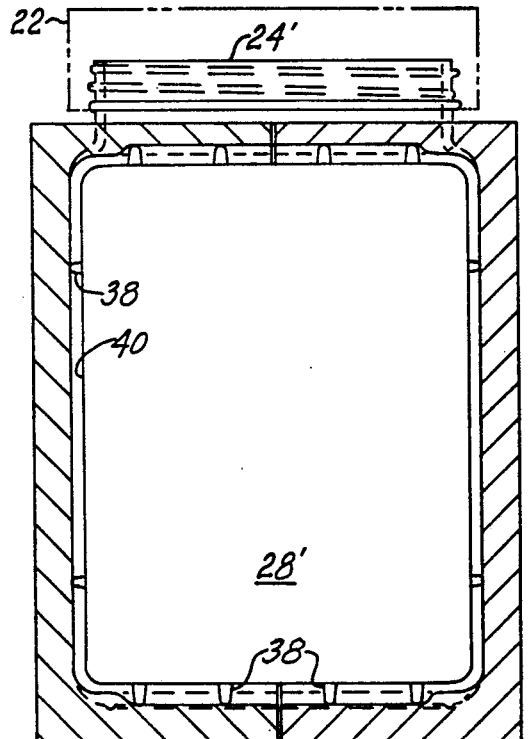

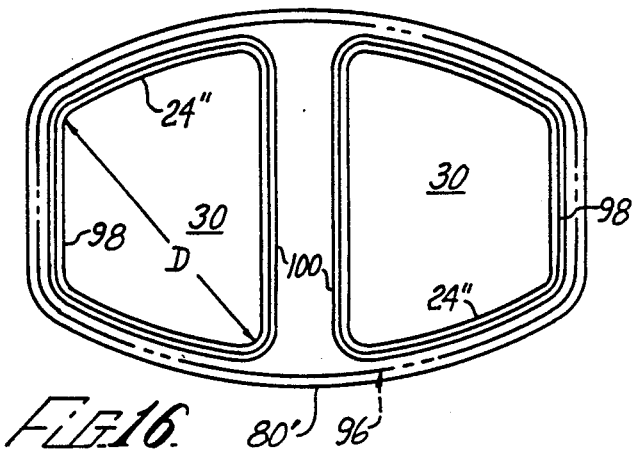
FIG.16.
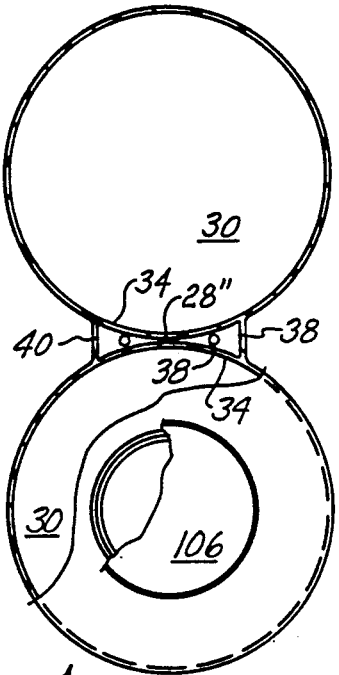
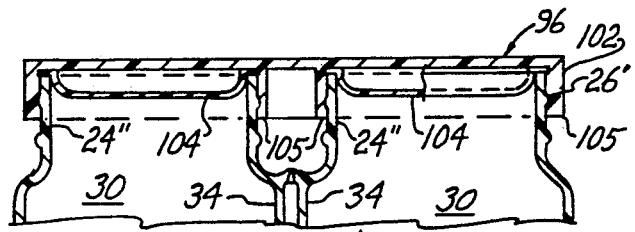
FIG.17.
FIG.18.
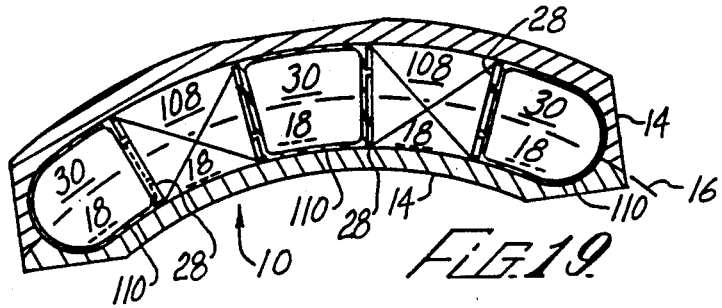
FIG.19.
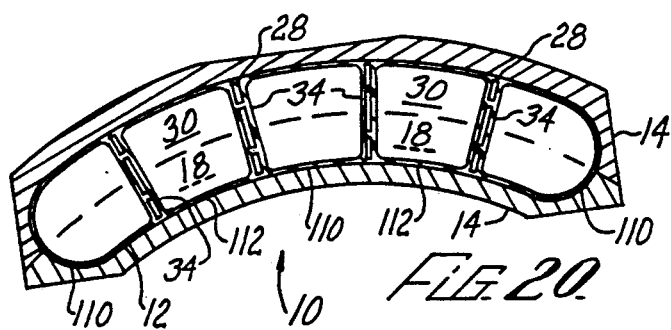
FIG.20.
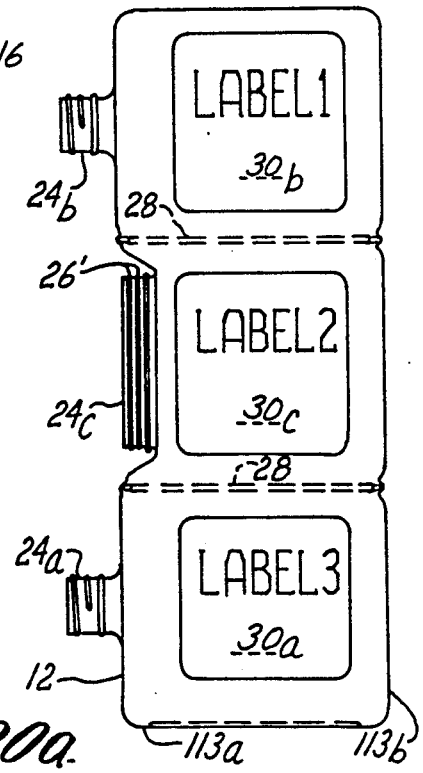
FIG.20a.

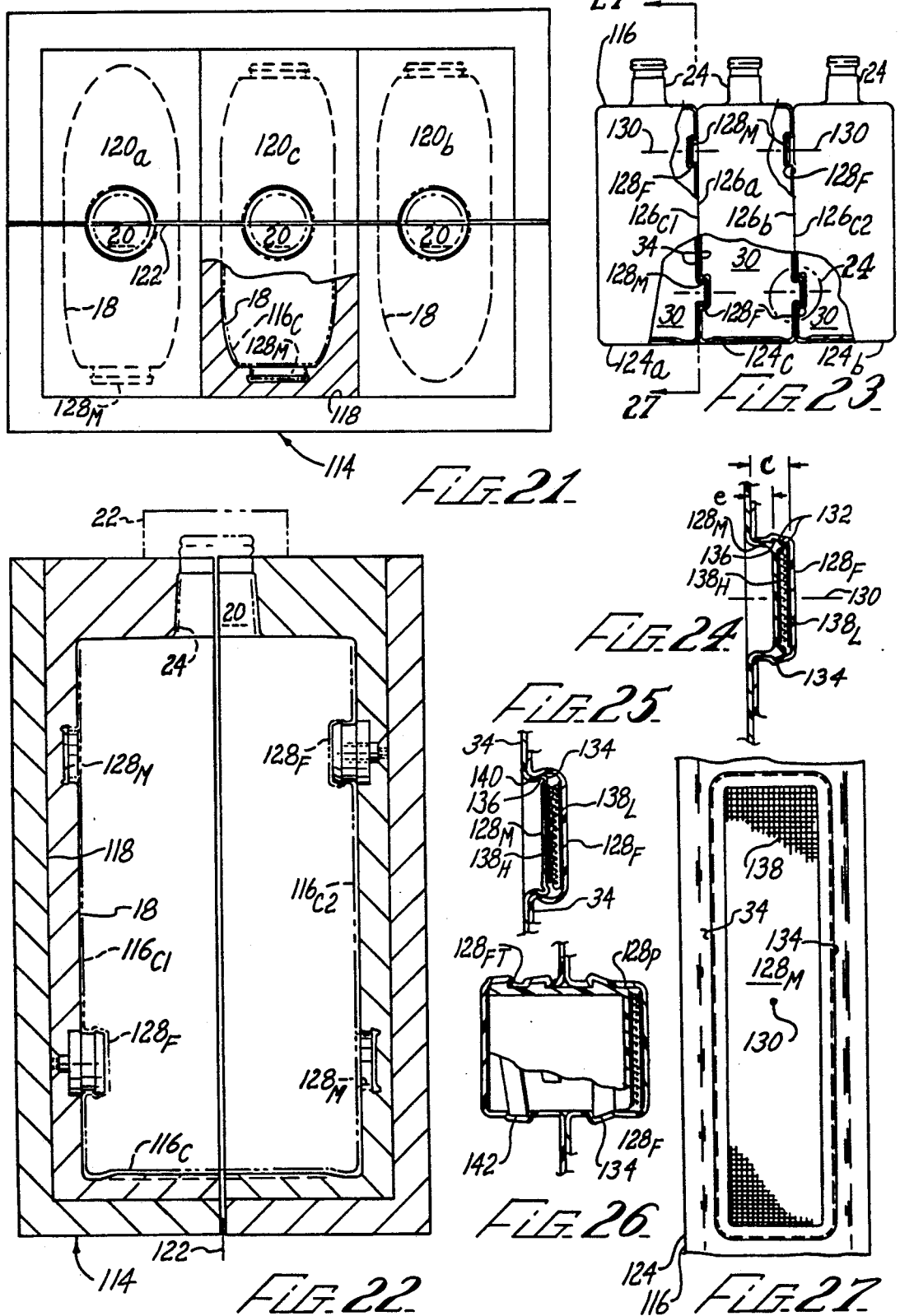

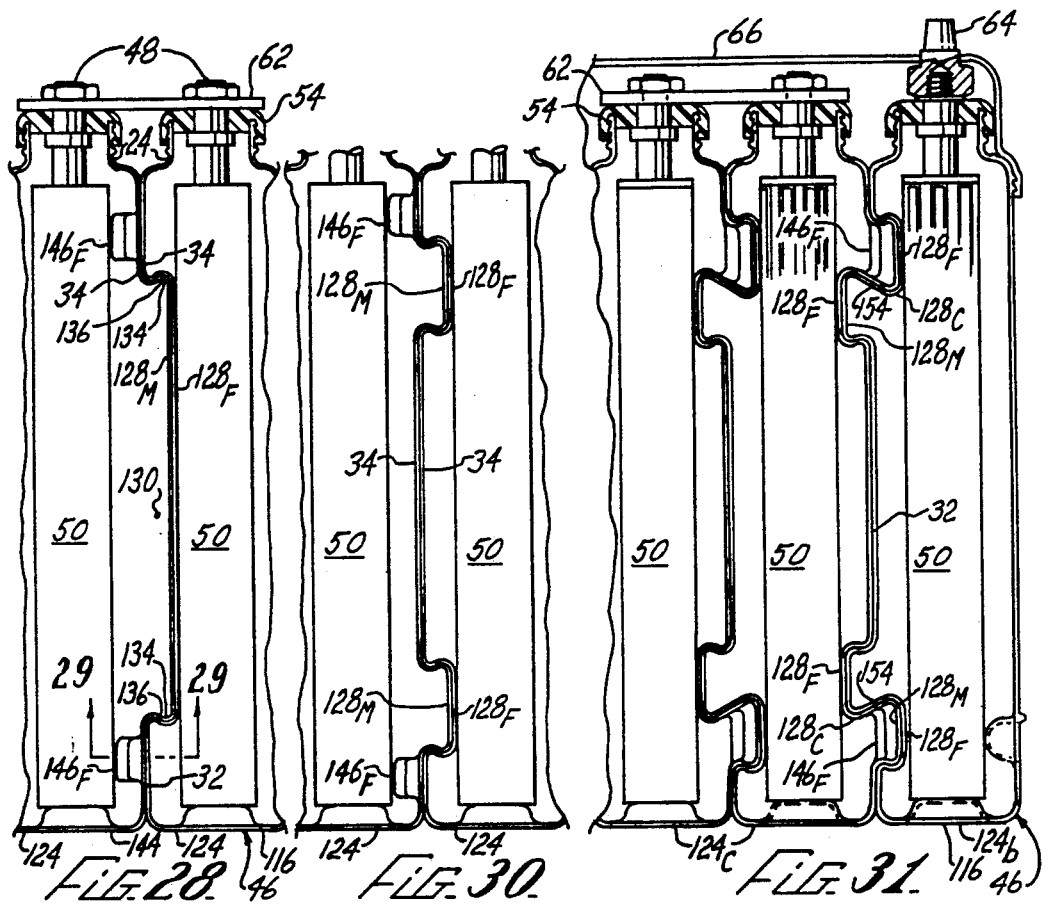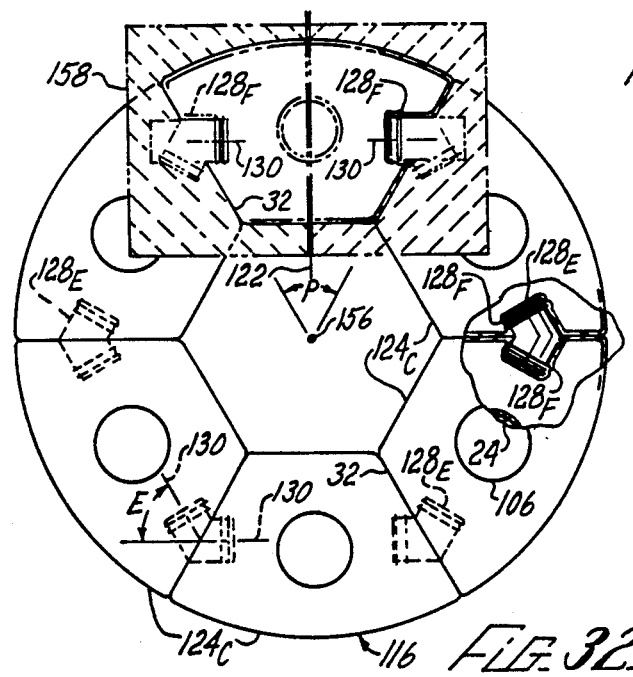

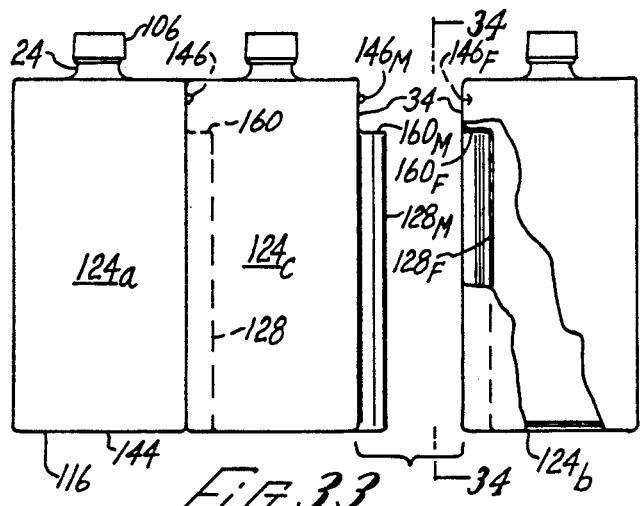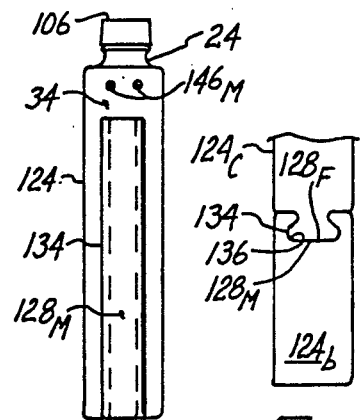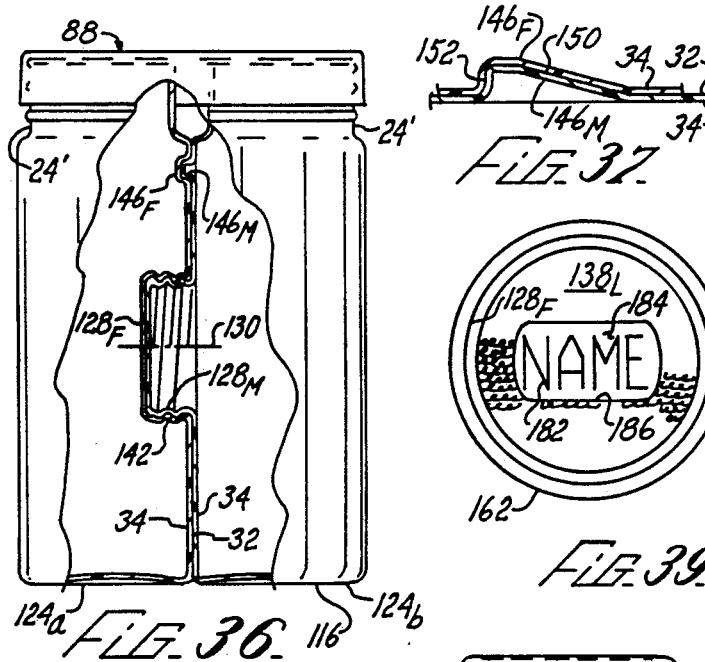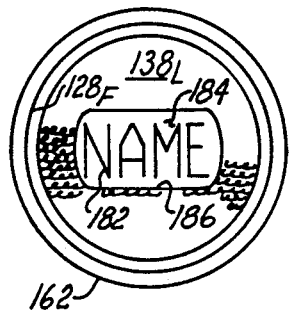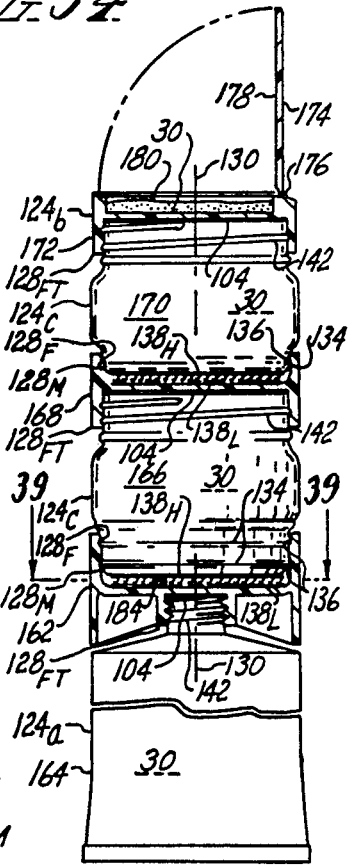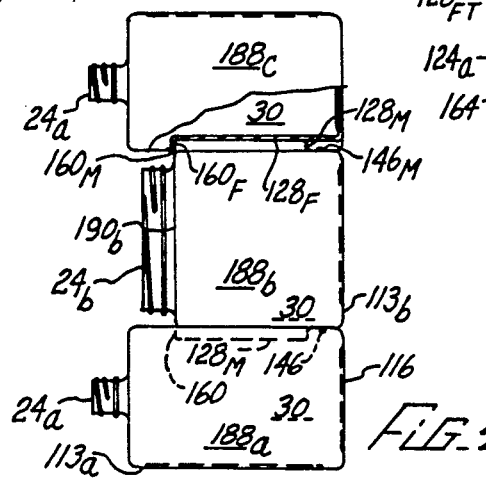

MODULAR MULTI-COMPARTMENT BLOW MOLDED CONTAINER

RELATED APPLICATION

This application is a continuation-in-part of application Ser. No. 07/578,551, filed on Sep. 4, 1990, now pending, which is incorporated herein by this reference.

BACKGROUND

The present invention relates to blow molding of blow molded containers, and more particularly to multiple compartment containers such as bottles and the like, multi-compartmented products such as multi-celled batteries, and multi-component products including foods and non-edibles such as cosmetics, in powders, creams, solids, or liquids.

Plastic molding is done in a variety of ways. For example in straight injection molding, a mold cavity is completely filled with a molten thermoplastic material at high pressure via one or more sprue openings of the cavity. Once the material has solidified, the mold is opened and the molded part is ejected. Some draft for the mold is generally required, and necked cavities are normally prohibited in this process, because of a need for a "contractible" male mold portion. A multiple cavity mold that does not require significant draft, however, is disclosed in U.S. Pat. No. 3,673,302 to Halsall et al.

Necked containers are commonly produced in a variety of "blow-molding" processes, wherein a layer of semi-molten plastic is formed against the walls of a female mold cavity by differential gas pressure. In such processes, a hollow plastic tube or parison is positioned within the cavity in a high temperature condition, then expanded against the cavity, usually by compressed air. As compared with straight injection molding, blow molding of bottles and other containers is considerably less expensive, primarily because of the absence of a male mold portion, and because lower molding pressures and temperatures are required.

As used herein, the term "blow molding" is meant in its generic sense, including but not limited to vacuum forming, vacuum blow molding (including air-assist), centrifugal molding, stretch-blow molding wherein the parison is axially stretched by mechanical means prior to final forming, injection blow molding wherein the parison is injection molded prior to its being positioned within the cavity, and extrusion blow molding wherein the parison is formed by an extruder die as it is being introduced into the cavity. Another included form of blow molding is rotational blow molding wherein sequential molding steps are performed simultaneously such as by means of an indexing mechanism that moves workpieces into location with a sequence of stations.

U.S. Pat. No. D214,549 to Ledewitz, U.S. Pat. No. D192,980 to Mangini et al., and U.S. Pat. No. D280,599 to Green each show necked multiple compartment containers that are integrally molded. A problem with such containers is that the mold itself does not define the shape of an interior wall between the compartments. Instead, the interior wall is formed by joinder of expanding bubble portions of the plastic material that are formed in mold cavity portions that define the exterior shapes of adjoining compartments of the container. The effects of gravity and/or a slight pressure differential between the compartments during molding can produce an unwanted wall contour or complete failure of the interior wall. Thus the interior wall is typically made quite narrow by the use of inward mold projections that form slots or depressions on opposite sides of the container in line with the interior wall. A disadvantage of this method for forming multiple compartment containers is that it is often desired that the exterior of the container be free of such slots or depressions.

Another problem with such integrally formed containers is that the mold cycle time is made longer to the extent that inwardly extending mold projections or blades for forming the slots require longer cooling times. Also, the interior wall, not being in contact with the mold, is not cooled thereby. Thus the interior wall is subject to deformation even after the exterior walls have substantially solidified, especially upon ejection of the part from the mold and transport thereof. A further problem, especially when the depth of opposing depressions approaches the width of the container, is that the container is weakened such that it can flex, the region between the slots acting as a hinge. Moreover, the slots collect contamination and are difficult to clean.

Multiple compartment necked containers can be produced by joining separate containers to form a unitized package, such as is described in U.S. Pat. No. 4,196,808 to Pardo. This type of packaging exhibits one or more of the following disadvantages:

1. The structural integrity of the package is suspect. For example, when a plastic band joins a pair of loaded containers, lifting of one container is likely to produce slippage between the containers. When three or more containers are so joined, central ones are likely to separate from the group when the package is lifted by any subset of the containers.

2. The band is an adverse factor in labeling the package, in that printed matter such as names and instructions on the band is subject to degradation by stretching the band onto the containers, while printing onto the installed band is awkward, and subject to random positioning on the package, and the band obscures (at least partially) much of the outside surfaces of the containers.

3. If the band is removed for separating the containers, the band may not normally be reused, whether it is cut apart or not. Thus once the containers are separated, they cannot be conveniently reconnected in the field.

Multiple compartment containers are commonly used in the production of multi-celled batteries, such as in the automotive industry. The cells are in separate compartments, which must be sealed from each other. In conventional construction, a case of the battery is injection molded with partitions for defining the compartments, the partitions extending to flush with outside walls of the case. Interconnections between the cells are made by a system of angle plates and bolts that sealingly protrude the partitions. These interconnections are complicated and awkward to assemble. Also, a cover for the case must be sealingly connected along each of the partitions as well as along the outside walls of the case. It is difficult to reliably obtain such sealed connections. Moreover, detection of flawed seals is cumbersome and expensive, and repair in such instances is at best only marginally practical.

Thus there is a need for a multiple compartment container that can be inexpensively molded without the above disadvantages.

SUMMARY

The present invention is directed in one aspect to a modular multiple compartment container that meets this need. The container includes a molded plastic material forming walls of first and second compartments of the container, at least one of the walls of the first compartment having an outwardly facing first cavity member connected thereto, the first cavity member defining a first cavity axis, and at least one of the walls of the second container having means for supporting an exterior first boss member in protruding relation thereto for locational engagement with the first cavity member of the first compartment, the first boss member defining a first boss axis, the first boss axis being parallel and concentric with the first cavity axis; and spacing means for holding the first cavity member at a predetermined axial position relative to the first boss member. The first cavity axis can be perpendicular to the one wall of the first compartment, and the first boss axis can be perpendicular to the one wall of the second compartment. The respective container walls can be in contact at the predetermined axial position.

Preferably index means is included for holding the respective container walls in angular registration about the first cavity and boss axes. The respective container walls can be side walls of the corresponding first and second compartments. The first boss member can be integrally formed with the side wall of the second compartment.

The spacing means can include a radially protruding ring portion of the first boss member for engaging the first cavity for holding the first boss member within the first cavity. Preferably the spacing means can include a thread member on the first boss member for threadingly engaging the first cavity member. The spacing means can include a first fastener member fixedly connected to a floor portion within the first cavity member, and a second fastener member fixedly connected to an end portion of the first boss member, the fastener members releasably holding the first boss member in engagement with the first cavity member. The first boss and cavity axes can be parallel to the respective container walls, the first boss member having dovetail sliding engagement with the first cavity member.

Preferably the spacing means includes a detent member on one of the first and second compartments for biasingly engaging a detent cavity on the other compartment. The spacing means can include an end extremity of the cavity member, the cavity member end extremity contacting a boss end extremity of the boss member. Preferably the spacing means includes shear adhesive means for preventing sliding contact between the side walls of the first and second compartments.

The first boss member can be connected to the side wall of the second container by engagement with a boss cavity in the side wall. The first boss member can threadingly engage the boss cavity and can include a snap engagement portion outwardly extending therefrom for holding the first boss member in rigid engagement with the boss cavity in the side wall. Preferably the index means includes a detent member on one of the first and second compartments for biasingly engaging a detent cavity on the other compartment.

The respective container walls can be top and bottom walls of the corresponding first and second compartments. The second compartment can include a neck wall forming an opening of the second compartment, the first boss member forming a lid for sealingly closing the second compartment. The container can further include a first fastener member fixedly connected to a floor portion within the first cavity member, and a second fastener member fixedly connected to an end portion of the first cavity member, the fastener members releasably holding the first boss member in engagement with the first cavity member. The first cavity member can be integrally formed with the first compartment. One of the fastener members can be a multiple hook member, and the other fastener member can be a multiple loop member, the hook members releasably engaging the loop members.

The first boss member can be removably connected to a boss attachment portion of the second compartment. The boss attachment portion of the second compartment can form a neck wall having an opening into the second compartment, the first boss member forming a lid for sealingly closing the second compartment. The first boss member can threadingly engage the neck wall, the first cavity member being rigidly rotationally coupled to the first boss member.

The container can also include cap fastener means for releasably holding the first cavity member in axial engagement with the first boss member. The cap fastener means can include a pair of fastener members, including a hook member and a loop member, each of the fastener members being rigidly connected to one of the cavity member and the boss member in a cap plane, the cap plane being perpendicular to the first cavity and boss axes.

Preferably one wall of the second compartment has an outwardly facing second cavity member connected thereto for defining a second cavity axis parallel to the first boss axis, and wherein the one wall of the first compartment has an exterior second boss member protruding therefrom for locational engagement with the second cavity member of the second compartment, the second boss member defining a second boss axis parallel to the first cavity axis, the second boss axis being concentric with the second cavity axis.

In another aspect of the invention, a multi-celled battery includes the container with a plurality of the compartments having corresponding neck openings, in combination with cell plate means in each of the compartments, each cell plate means having a pair of parallel, upstanding conductive terminal members for conducting electrical current to and from the plate means; cover member means sealingly closing the neck openings, the terminal members sealingly protruding the cover member means; and bus means external of the compartments and the cover member means for serially connecting at least some of the plate means by the terminal members. The cover member means can include a separate cover for each of the neck openings. The bus means can include a conductive strap member connecting one of the terminal members of neighboring cell plate means. The container can be formed to include an external lid discontinuity surrounding the compartments proximate the neck openings, the battery further including a lid member retained by the lid discontinuity for covering the bus means, an end pair of the terminal members protruding the lid member for external electrical connections of the battery.

In further aspect of the invention, the container can include the molded plastic material forming walls of a first compartment of the container, at least one of the walls forming a threaded neck portion, the neck portion having a neck opening and defining a neck axis of the first compartment; a molded plastic material forming walls of a second compartment of the container and a coupling engagement surface external to the compartment for defining a coupling axis; a coupling member for releasably engaging the coupling engagement surface and threadingly engaging the neck portion, the neck axis being concentric with the coupling axis, the neck opening of the first compartment being sealingly closed by the threaded engagement of the coupling member with the neck portion; and means for releasably locking the coupling member to the coupling engagement surface of the second compartment in a selected angular orientation about the coupling axis, whereby the second compartment has a desired orientation relative to the first compartment when joined thereto by the coupling member, with the first compartment sealingly closed by the coupling member. The means for releasably locking the coupling member can include a first fastener member fixedly connected to a floor portion of the coupling member, and a second fastener member fixedly connected to an end portion of the second compartment, the fastener members releasably holding the second compartment in engagement with the coupling member. One of the fastener members can be a multiple hook member, and the other fastener member being a multiple loop member, the hook members releasably engaging the loop members. The coupling member can include a coupling cavity portion, and the coupling engagement surface forming a boss portion of the second compartment, the boss portion axially engaging the coupling cavity portion of the first compartment.

DRAWINGS

These and other features, aspects, and advantages of the present invention will become better understood with reference to the following description, appended claims, and accompanying drawings where:

FIG. 4 is a sectional elevational end view as in FIG. 2, showing a battery incorporating the container of FIG. 1;

FIG. 5 is a fragmentary sectional elevational side view as in FIG. 3, showing the battery of FIG. 4;

FIG. 6 is a fragmentary sectional elevational end view of a portion of the battery of FIG. 4;

FIG. 7 is a fragmentary sectional elevational side view of the battery of FIG. 6 on line 7—7 therein;

FIG. 8 is a fragmentary elevational perspective view showing an alternative configuration of a portion of the molding apparatus of FIG. 1;

FIG. 9 is an end sectional elevational detail view of a portion of the apparatus of FIG. 8;

FIG. 10 is a fragmentary sectional plan view of an alternative configuration of the apparatus and container of FIG. 1;

FIG. 11 is a sectional elevational view of the apparatus of FIG. 10 on line 11—11 therein;

FIG. 12 is a sectional elevational view of the apparatus of FIG. 10 on line 12—12 therein;

FIG. 13 is a bottom plan view of a lid for the container of FIG. 10;

FIG. 14 is a fragmentary sectional elevational view showing the lid of FIG. 13 partially closed on the container of FIG. 10;

FIG. 15 is a fragmentary sectional elevational view as in FIG. 14, showing the lid of FIG. 13 fully tightened onto the container of FIG. 10;

FIG. 16 is a plan view showing an alternative configuration of the container of FIG. 10;

FIG. 17 is a fragmentary sectional elevational view showing an alternative configuration of the lid of FIG. 13 on the container of FIG. 16;

FIG. 18 is a fragmentary plan view showing an alternative configuration of the container of FIG. 10;

FIG. 19 is a fragmentary sectional elevational diagram view showing an alternative configuration of the apparatus of FIG. 10 for forming a first set of container chambers;

FIG. 20 is a fragmentary sectional end diagram view showing the apparatus of FIG. 19 configured for forming a second set of container chambers integral with the first container chamber;

FIG. 20a is a side elevational view of another alternative configuration of the container of FIG. 1;

FIG. 21 is a fragmentary sectional plan view showing an alternative configuration of the apparatus of FIG. 1;

FIG. 22 is a sectional elevational end view as in FIG. 2 of the apparatus of FIG. 21;

FIG. 23 is a fragmentary sectional elevational side view showing the container 21 in a connected or attached condition;

FIG. 24 is a fragmentary sectional elevational detail view within region 24 of FIG. 23;

FIG. 25 is a fragmentary sectional detail view as in FIG. 24 showing an alternative configuration of the container of FIG. 21;

FIG. 26 is a fragmentary sectional detail view as in FIG. 24 showing another alternative configuration of the container of FIG. 21;

FIG. 27 is a fragmentary end elevational view on line 27—27 of FIG. 23 showing an alternative configuration of the container of FIG. 21;

FIG. 28 is fragmentary sectional side elevational view showing an alternative configuration of the battery of FIG. 4;

FIG. 29 is a fragmentary sectional detail plan view of the battery of FIG. 28 on line 29—29 of FIG. 28;

FIG. 30 is a fragmentary sectional side elevational side elevational view as in FIG. 28 showing another configuration of the battery of FIG. 28;

FIG. 31 is a fragmentary sectional side elevational side elevational view as in FIG. 28 showing a further configuration of the battery of FIG. 28;

FIG. 32 is a fragmentary sectional plan view of another alternative configuration of the apparatus and container of FIG. 21;

FIG. 32a is a fragmentary sectional plan detail view showing an alternative configuration of a portion of the container of FIG. 32;

FIG. 33 is fragmentary sectional side elevational view showing another alternative configuration of the container of FIG. 21;

FIG. 34 is an end elevational view of the container of FIG. 33 on line 34—34 therein;

FIG. 35 is a fragmentary bottom elevational view of a portion of the container of FIG. 33;

FIG. 36 is a fragmentary sectional side elevational view showing another configuration of the container of FIG. 21;

FIG. 37 is a fragmentary plan sectional detail view of the container of FIG. 36 on line 37—37 therein;

FIG. 38 is a fragmentary sectional elevational view showing a further configuration of the container of FIG. 21;

FIG. 39 is a plan view showing the container of FIG. 38 on line 39—39 therein, a container portion thereof having been removed; and FIG. 40 is a side elevational view of another alternative configuration of the container of FIG. 21.

DESCRIPTION

Figure 1:
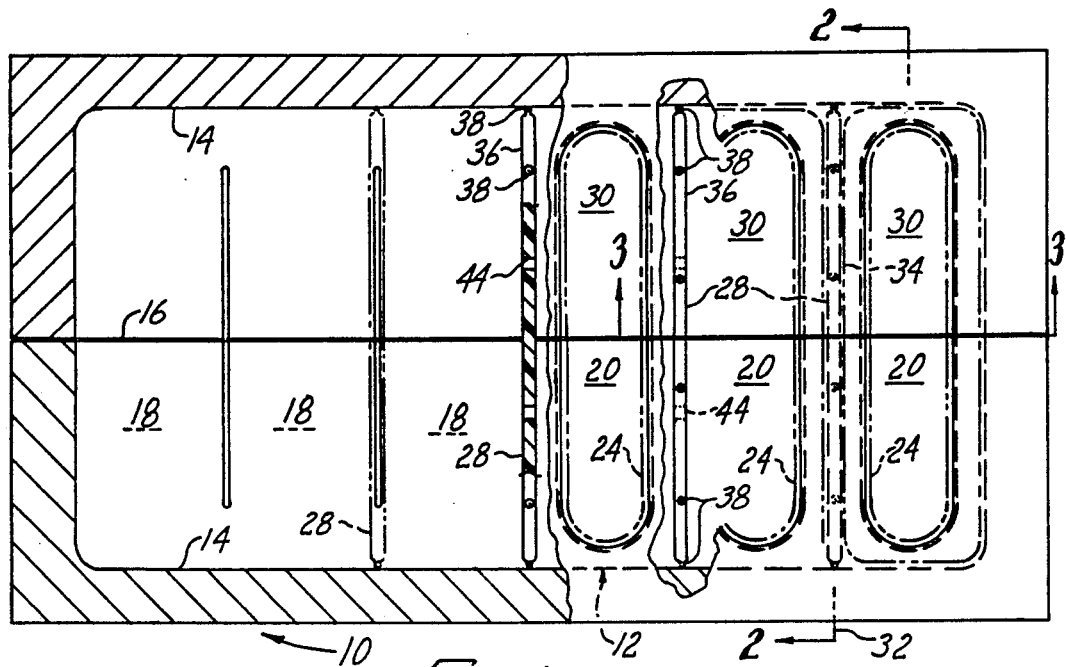
FIG. 1 is a fragmentary sectional plan view of a blow molding apparatus for a multiple compartment container according to the present invention.
Figure 2:
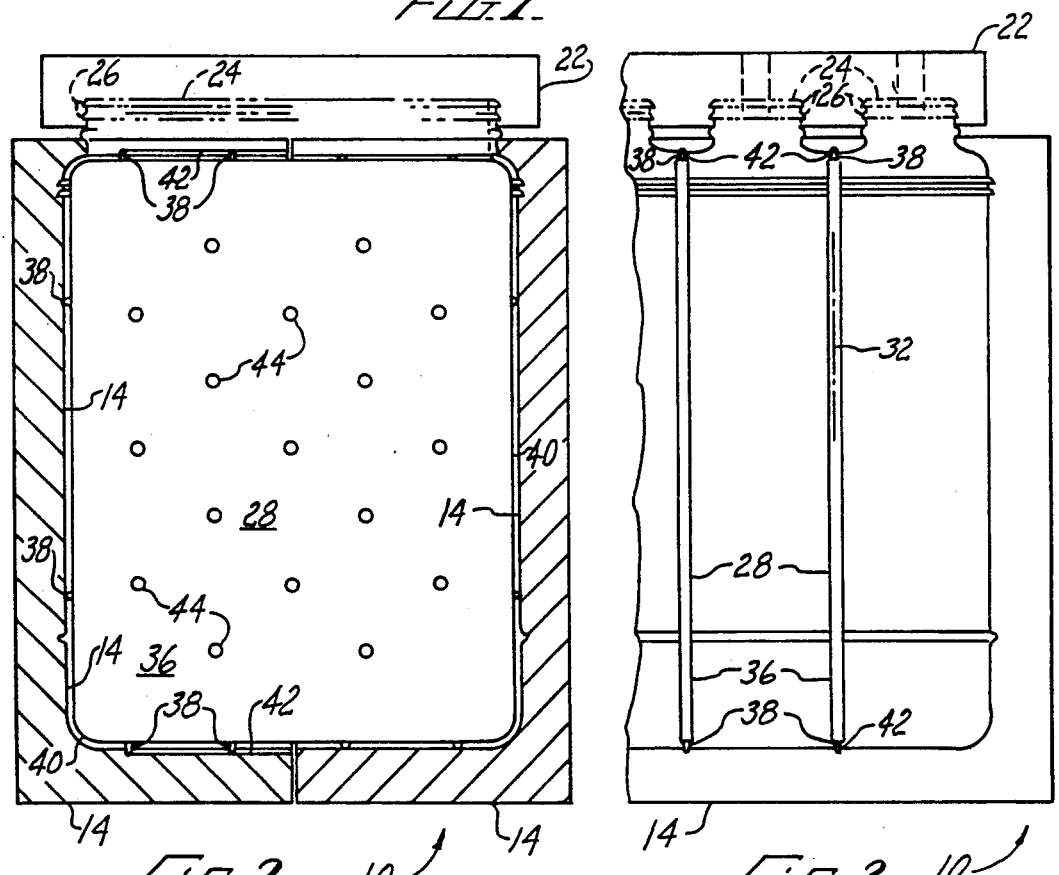
FIG. 2 is a sectional elevational end view of the apparatus of FIG. 1 on line 2—2 therein.
Figure 3:
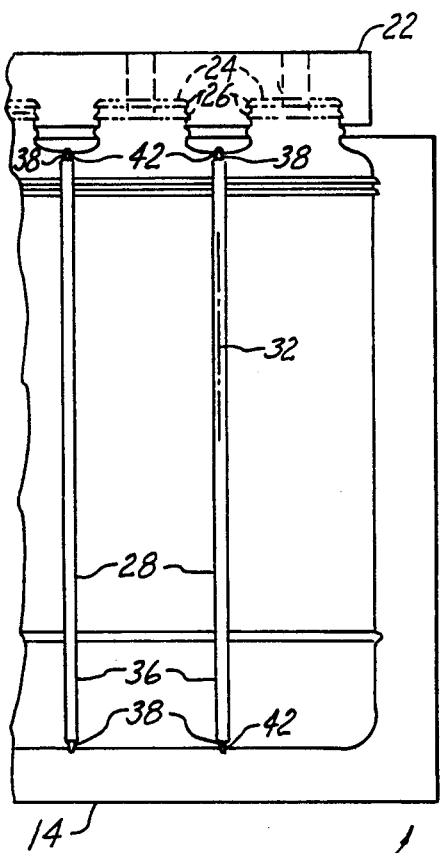
FIG. 3 is a fragmentary sectional elevational side view of a portion of the apparatus of FIG. 1 on line 3—3 therein.

The present invention is directed to a multiple compartment container that is particularly suitable for blow molding. With reference to FIGS. 1-3 of the drawings, a mold 10 for producing a multiple compartment container 12 includes a facing pair of female mold cavities 14 that define an external body configuration for the container 12 to be molded therein on opposite sides of a split seam or parting surface 16. By way of example, the container 12 of FIGS. 1-5 provides a case for a multi-celled battery, described below, the container 12 having a plurality of container cavities 18. As further shown in the drawings, the mold 10 defines a plurality of neck regions 20 through which multiple parisons of plastic material for the container 12 are fed at elevated temperature in a conventional manner from a gang-type extruder die 22 (or individual extruder dies). A neck member 24 is associated with each neck region 20, a pair of snap-fitting protrusions 26 being formed on each neck member 24. Typically, the mold 10 is provided with conventional extractor means (not shown) and cooling means (also not shown).

Where the parisons are formed by an extruder and when the parisons exit the die and develop a preset length, the split cavity mold 10 closes around the parisons and pinches one end of each parison. Compressed air inflates the parisons against the hollow blow mold surfaces, which cool the inflated parisons to the blow mold configuration. Upon contact with the cool mold wall, the plastic cools and sets the part shape. The mold 10 opens, ejects the blown part or container 12, and closes around the parisons to repeat the cycle. A parison programmer may be used for shaping the parisons to match complex blow mold shapes, and multiple station clamp systems can be used for improving output through the use of multiple molds.

According to one aspect of the present invention, the mold 10 includes a partition member 28 for separating adjacent compartments 30 of the container 12, there being one less of the partition members 28 than the number of the compartments 30. Each partition member 28 nominally defines a partition surface 32 that is typically planar, but may have other shapes. The partition members 28, which become an integral part of corresponding partition portions 34 of the container 12 during the molding process described herein, are retained and located within the mold 10 by a plurality of discontinuities in one or both of the mold 10 and each partition member 28. For example, and as shown in FIGS 1-3, each partition member 28 is formed as a planar body portion 36 having a plurality of coplanar, outwardly projecting prong portions 38 for engaging the mold cavities 14, whereby an edge profile 40 of the body portion 36 is spaced away from the mold cavities 14. A pair of registration slots 42 in each of the mold cavities 14 locates each of the partition members 28 within the mold 10 in a direction generally perpendicular to the partition surface 32.

During the blow molding process, which can be any variation of a process in which a layer of semi-molten plastic material is formed against a mold cavity by differential fluid pressure, the plastic material flows between the edge profile 40 of each partition member 28 and the mold cavity 14, substantially enclosing the partition member 28. The partition members 28 thus form portions of the mold 10 during the molding process for defining the shapes and locations of the partition portions 34 of the container 12. The partition members 28 then become extracted from the mold 10, being part of the container 12.

Normally, the partition member 28 is also a molded plastic part, the plastic preferably having a slightly higher melting point that the material of the container 12 for maintaining the structural integrity of the partition members during the process of blow molding the container 12. It is anticipated, however, that even with the same melting point, there would normally be no failure of the partition member 28 because of cooling of the partition portions 34 by the body portion 36 of each partition member 28. Alternatively, the partition member 28 can be made from metal. In the configuration of FIGS. 1-3, the extremities of the prong portions 38 become minimally exposed at the exterior of the container 12 to the extent of locating contact between the prong portions 38 and the mold cavities 14 during the feeding and solidifying of the plastic material.

In injection blow molding wherein the parison is formed in an auxiliary injection mold station, the partition member 28 can be injection molded in the auxiliary mold station, then transferred to the mold 10 by a mechanism similar to that used for transferring the parison. Alternatively, the partition member 28 can be stockpiled at room temperature, being used as needed.

As best shown in FIG. 2, each partition member 28 can be formed with one or more tie passages 44 for connecting the plastic material between opposite sides of the partition member 28 within the edge profile 40. The tie passages 44 thus contribute to the structural integrity of the partition portions 34 by preventing separation of the layers of plastic material from opposite sides of the partition member 28.

With further reference to FIGS. 4 and 5, a multi-celled battery 46 includes the container 12 as described above, each of the compartments 30 housing a cell unit 48 that includes a plate assembly 50 and a pair of rigidly connected, upstanding terminal posts 52 that extend upwardly through respective ones of the neck regions 20. A cell cap member 54 sealingly covers each of the compartments 30 by engaging the associated neck member 24, a redundant seal being provided by a plug portion 56 of the cap member 54 that extends within the neck member 24, in combination with sealing engagement of the cap member 54 over each of the snap-fitting protrusions 26, the protrusions 26 also retaining the cap member 54 in place. The terminal posts 52 of each cell unit 48 also protrude the respective cell cap member 54, the cap members 54 being sealingly clamped between a shoulder portion 58 of each terminal post 52 and clamp nut means 60 that threadingly engages the post 52. As best shown in FIG. 5, serial electrical connections between the cell units 48 are made by one or more bus straps 62 that are fitted over a pair of the terminal posts 52 of adjacent plate assemblies 50, the straps 62 being clamped between the nut means 60 and the associated cell cap member 54. An end terminal 64 for the battery 46 also serves as the clamp nut means 60 on at least two of the terminal posts 52, for providing external electrical connections to the battery 46. As further shown in FIGS. 4 and 5, a cover member 66, which can be injection molded from a suitable plastic, protectively covers the bus straps 62, being protruded by the end terminals 64. The cover member 66 is sealingly retained on the container 12 by counterparts of the protrusions 26, designated 26' in the drawings.

Structural support for the plate assembly 50 is provided by the connection of the terminal post 52 to the cell cap member 54. Further structural support is provided by one or more locating portions 68 of the container 12 proximate the lower extremity of each of the compartments 30 as shown in FIGS. 4 and 5. As further shown in FIGS. 4 and 5, a belt member 70 forms a perimeter protrusion of the container 12 for facilitating clamping of the battery 46 onto a suitable mounting surface (not shown).

With further reference to FIGS. 6 and 7, the container 12 can include a variety of supporting provisions for the contents of the compartments 30. For example, and as shown in FIG. 6, a side indentation 72 is formed in opposite sides of the container 12 immediately below the belt member 70 for constraining lateral movement of each plate assembly 50 in the plane of the terminal posts 52. A bottom indentation 74 of the container 12 also augments support of the plate assembly 50 in a direction axially parallel to the terminal posts 52. Further, and as shown in FIG. 7, each of the partition members 28 can have a plurality of crown portions 76 therein, the crown portions 76 facing in opposite directions from the partition surface 32 for supporting the adjacent plate assemblies 50 in a direction perpendicular to the terminal post planes of the respective cell units 48.

With further reference to FIGS. 8 and 9, an alternative configuration for the support of the partition members 28 in the mold cavities 14 is provided by a pair of boss portions 78 of each mold cavity 14 for locally supporting opposite sides of the partition member 28. While the boss portions 78 provide support for the partition member 28 in a direction perpendicular to the partition surface 32, support in the plane of the partition surface 32 is provided by direct localized contact by portions of the mold cavity 14 that define the outside contours of the container 12 against the edge profile 40 of the partition member 28, as best shown at 79 in FIG. 9.

With further reference to FIGS. 10-12, an alternative configuration of the mold 10, designated mold 10', provides the container 12 configured as a multi-compartment jar or bottle 80. The mold 10' has counterparts of the mold cavities 14, the parting surface 16, the container cavities 18, and the neck regions 20. Similarly, a counterpart of the extruder die 22 forms a pair of neck members 24' having counterparts of the protrusions 26, designated thread members 82. The mold 10' also has a counterpart of the partition member 28, designated partition member 28' for forming a pair of the compartments 30 in the bottle 80, the partition member 28' defining counterparts of the partition surface 32 and the partition portions, designated 34'. In the configuration of FIGS. 10-12, the partition member 28' also has counterparts of the body portion 36, the prong portions 38, and the edge profile 40, the prong portions 38 at the top and bottom of the partition member 28' also engaging counterparts of the registration slots 42.

As best shown in FIG. 10, an outwardly facing contour portion 84 of each neck member 24' is circularly cylindrical about a common centrally located thread axis 86 such that the thread members 82 form helical segments for threaded engagement with a lid, described below. Also, the neck members 24' are spaced apart for avoiding inadvertent contamination of the contents of each of the compartments 30 when material is being removed from the other compartment 30.

With further reference to FIGS. 13-15, a lid assembly 88 for the bottle 80 threadingly engages the thread members 82 for simultaneously sealingly closing each of the neck members 24'. The lid assembly 88 includes an exterior lid member 90 having a generally disk-shaped gasket member 92 rotatably mounted therein, the gasket member 92 being sealingly clamped between the lid member 90 and the tops of the neck members 24' when the lid member 90 is tightened onto the thread members 82. At least one registration portion 94 of the gasket member 92 projects below the tops of the neck members 24' for locking the gasket member 92 into rotational alignment with the neck members 24' as the lid member 90 is advanced toward its clamped position. As shown in FIG. 14, when the lid member 90 is advanced partway onto the neck members 24', the registration projection(s) 94 advances into contact with the top of one or both of the neck members 24'. At this point, the gasket member 92 continues to rotate with the lid member 90 as the lid assembly 88 is further advanced on the thread members 82, the lid member 90 and the gasket member 92 being slightly deflected away from the tops of the neck members 24' until the registration projection(s) 94 become aligned with the neck members 24', the lid assembly 88 assuming a relaxed configuration wherein the registration projection(s) 94 extend slightly below the tops of the neck members 24' as shown in FIG. 14, the gasket member 92 being prevented from further rotation by engagement of at least one of the projections 94 with a side wall of one of the neck members 24'. Continued rotation of the lid member 90 for advancing the lid assembly 88 onto the thread members 82 produces the position shown in FIG. 15, wherein the gasket member 92 is clamped between the lid member 90 and the tops of the neck members 24'. Conversely, when the lid assembly 88 is removed from the bottle 80, the gasket member 92 is prevented from rotating with respect to the neck members 24' until the registration projection(s) 94 clear the tops of the neck members 24', from which point the gasket member 92 continues to rotate with the lid member 90 until complete removal of the lid assembly 88 is effected.

The lid member 90 can be made of metal or a suitable plastic such as polypropylene, which can be injection molded. The gasket member 92 can be injection molded, then snapped into the lid member 90. Alternatively, a disk portion 95 of the gasket member 92 can be snapped in place, the projections 94 being injection molded (and fused) onto the disk portion 95.

With further reference to FIGS. 16 and 17, an alternative configuration of the bottle 80, designated 80', is provided with a snap on-type counterpart of the lid assembly 88, designated lid assembly 96. The lid assembly 96 is openably connected to counterparts of the neck members 24, designated neck members 24" in FIGS. 16 and 17. An important feature of the bottle 80' is that its neck members 24" have an outwardly facing contour that is non-circular. In particular, each of the neck members 24" has an outside extremity portion 98 that is generally flat and parallel with an inside extremity portion 100 that defines a separation of each neck member 24" with the other neck member 24". Relatively sharply curved corner contours are thus formed in each neck member 24" for providing an enhanced diagonal clearance distance D within each neck member 24", for facilitating manipulation of a spoon, knife, or other utensil within each neck member 24" when it is desired to extract a food product or other material from a selected one of the compartments 30 of the bottle 80'.

The lid assembly 96 has a snap-type lid member 102 that releasably engages counterparts of the protrusions 26, designated 26' in FIGS. 16 and 17. A pair of gasket members 104 of the lid assembly 96 are sealingly clamped between the lid member 102 and the tops of the neck members 24" by the engagement with the protrusions 26'. The gasket members 104, which can have a uniform thickness, preferably extend into the neck member 24" for permitting excess gas pressure within the bottle 80' to equalize by upward deflection of the extending portions of the gasket member 104. Also, a flange portion 105 of the lid member 102 separately encloses each of the neck members 24" for strengthening the sealed connection of the lid assembly 96 to the bottle 80'.

With further reference to FIG. 18, another alternative configuration of the bottle 80 has compartments 30 circularly cylindrically shaped on opposite sides of a concave counterpart of the partition member 28, designated partition member 28". In this configuration, separate counterparts of the lid assembly 88, designated 106, sealingly close each of the compartments 30. The extra thickness along the side portions of the edge profile 40 enhances the longitudinal strength and rigidity of the partition member 28".

A method for making the container 12 of the present invention includes the steps of providing a mold 10 for defining an outside contour of the container 12; locating the partition member 28 within the mold 10 for defining a partition surface 32 that intersects the outside contour between adjacent compartments 30 of the mold 10; feeding a plastic material into the mold 10; forming the plastic material against the outside contour surface and against opposite sides of the partition member 28; solidifying the plastic material; and removing the solidified material from the mold 10, the partition member 28 being retained between adjacent compartments 30 of the container 12.

With further reference to FIGS. 19 and 20, an alternative method for molding the container 12 is provided by temporarily inserting a plug member 108 in alternate ones of the container cavities 18 of the mold 10, the plug members 108 releasably supporting the partition members 28 against molding pressure from within the other cavities 18 during molding of corresponding container compartments 30 as described above. Once this first molding step is complete as shown in FIG. 19, the plug members 108 can be removed with the mold 10 opened, leaving the partition members 28 attached to the first-molded portions of the container 12, designated portions 110. With the mold 10 again closed about the first-molded portions 110, the alternate ones of the cavities 18 previously having the plug members 108 are blow molded for producing the remaining container cavities 30, the last-molded portions, designated 112, completing the container 12 as shown in FIG. 20.

As also illustrated in FIGS. 19 and 20, the parting surface 16 can be curved, the container 12 also being generally curved on opposite sides of the parting surface 16 for providing a desired aesthetic appearance of the container 12. This curved configuration also advantageously provides enhanced lateral stability of the container 12 when it is resting on a supporting surface.

With further reference to FIG. 20a, another alternative configuration of the container 12 has three of the compartments 30 stacked vertically, the compartments being designated 30a, 30b, and 30c, the neck members 24 opening horizontally relative to a first supporting surface 113a of the container 12. The supporting surface 113a, which forms an outside wall of the compartment 30a, is located in parallel spaced relation to the partition members 28. As shown in FIG. 20a, two of the neck members, designated 24a and 24b, form conventional threaded bottle necks protruding from the respective end compartments 30a and 30b, for receiving a conventional cap or dispenser (not shown) The neck member 24c is of larger diameter, having counterparts of the protrusion 26' for receiving a conventional snap-on lid, the neck member 24c being recessed within the compartment 30c. The compartment 30c is thus configured as a jar for receiving a relatively stiff product such as a cream or paste, or discrete objects such as cookies or candy. The recessed configuration of the neck member 24c facilitates removal of the product by a utensil or, especially in the case of discrete objects, also a user's fingers.

Each of the compartments 30 has an associated label for identifying the contents of the respective compartments 30, the labels having designations "LABEL1", "LABEL2", and "LABEL3", respectfully for the corresponding compartments 30b, 30c, and 30a, the labels being oriented for right reading when the container 12 is supported on its first supporting surface 113a. The container 12 also forms a second supporting surface 113b, the surface 113b being generally perpendicular to the partition members 28, opposite the neck members 24. Thus many of the containers 12 can be shelved within a small shelf area in the vertical orientation. When the neck members 24a and 24b are closed with a conventional valve-type or lid-type dispenser, the container 12 is preferably made suitably flexible for squeezing product from the respective compartments 30a and 30b. Convenient access to the compartment 30c is effected by resting the container 12 on its supporting surface 113b.

With further reference to FIGS. 21-24, a mold unit 114 for a modular configuration of the container 12, designated container 116, has a main mold cavity 118 for receiving a plurality of mold inserts 120, the main mold cavity 118 and the mold inserts 120 having a common parting surface 122. The mold inserts, designated 120a, 120b, and 120c, are configured for molding corresponding container portions 124a, 124b, and 124c of the container 116 in respective ones of the container cavities 18, each container portion 124 having a counterpart of the neck region 20, the neck member 24, and forming one compartment 30 of the container 116.

According to the present invention, facing sides 126 of the container portions 124 form counterparts of the partition surface 32 and the partition portions 34, the container portions 124a and 124b having respective sides 126a and 126b that abut corresponding sides $126c_1$ and 126$c_2$ of the container portion 124c. It will be understood that in the configuration of FIGS. 21-24, any number of the container portions 126c may be used to form the container 116, including zero, in which case the container portion 124a would be directly connected to the portion 124b.

As best shown in FIGS. 22-24, each of the partition portions 34 has at least one engagement member 128 extending therefrom for engaging a corresponding engagement member 128 of the adjacent container portion 124, each engaging pair of the engagement members 128 including a male engagement member 128$_M$ and a female engagement member 128$_F$. In the configuration of FIGS. 22 and 23, each partition portion 34 forms a pair of the engagement members 128, one each of the male and female engagement members 128$_M$ and 128$_F$, the engagement members 128 each being circularly symmetrical about an engagement axis 130 that is nominally perpendicular to the partition surface 32.

In further accordance with the present invention, engagement pairs of the engagement members 128 have holding means 132 for holding the partition portions 34 in facing engagement. As best shown in FIG. 24, the holding means 132 includes a radial protrusion 134 that is formed on the male engagement member 128$_M$, the protrusion 134 forming or fitting into a corresponding radial depression 136 in the mating female engagement member 128$_F$. Also, the holding means 132 includes an engaged pair of hook-loop fastener members, respectively designated 138$_H$ and 138$_L$, that are bonded to facing portions of the respective engagement members 128$_M$ and 128$_F$. It will be understood that the holding means 132 can include the protrusion 134 engaging the depression 136 or the hook fastener member 138$_H$ engaging the loop fastener member 138$_L$, or the combination. Rotational alignment of the container portions 124 about the engagement axis 130 is maintained by one or more of the frictional engagement torque of the engagement members 128, the hook engagement torque of the hook-loop fastener members 138, and the positive engagement orientation associated with the spaced pairs of the engagement members 128.

In the exemplary configuration of the engagement members 128 as illustrated in FIG. 24, the radial protrusion 134 is formed at an end extremity of the male engagement member 128$_M$, the hook fastener member 138 being recessed slightly for providing a generous depth of engagement e by the protrusion 134 within a limited cavity depth c of the female engagement member 128$_F$. With further reference to FIG. 25, an alternative configuration of the engagement members 128 has the male engagement member 128$_M$ shortened so that the protrusion 124 projects just into the female engagement member 128$_F$, the depression 136 being formed immediately adjacent to a mouth portion 140 of the female engagement member 128$_F$, the mouth portion 140 strengthening the member 128$_F$ at the depression 136 for enhancing the degree of holding by the engagement members 128.

With further reference to FIG. 26, an alternative configuration of the male engagement member 128$_M$, designated 128$_P$, both of the facing partition portions 34 of the container portions 124 having counterparts of the female engagement members 128$_F$ formed therein. An exemplary form of the pin engagement member 128$_P$ has a thread member 142 formed opposite the protrusion 134 for fixably holding the pin engagement members 128$_P$ with one of the female engagement members, designated 128$_{FT}$. In the configuration of FIG. 26, it is contemplated that separation of the container portions 124, if desired, would result in the pin member 128$_P$ being retained by the threaded engagement between the thread member 142 and the female engagement member 128$_{FT}$. If desired, the pin engagement member 128$_P$ can then be removed from the container portion 124 by unscrewing same.

As shown in FIG. 26, the pin member 128$_P$ is hollow, being closed at one end in a configuration suitable for injection molding. The pin member 128$_P$, which may also be blow molded, can be closed at both ends, or it can be formed as a solid part by any conventional means.

In an alternative configuration of the container 116, facing partition portions 134 are provided with a single engagement member 128, the engagement member 128 being configured for preventing relative rotation of the container portions 124 about the engagement axis 130. An exemplary rectangular configuration of the engagement member 128$_M$ is depicted in FIG. 27. It will be understood that the mating engagement member 128$_F$ in the configuration of FIG. 27 has a corresponding rectangular configuration. The rectangular configuration of the engagement member 128 enhances the structural integrity of the container 116 due to the increased length of engagement of the protrusion 134 against the depression 136 (in most cases), and by enlargement of the fastener members 138.

With further reference to FIGS. 28 and 29, another alternative configuration of the container 116 has dovetail-configured counterparts of the engagement members 128. The container 116 of FIGS. 28 and 29 is further configured as a housing for a counterpart of the multi-celled battery 46 of FIGS. 4-9, the battery 46 having counterparts of the cell units 48 and the cell cap members 54 that sealingly engage the neck members 24. The container portions 124 are joined by sliding engagement of the engagement members 128 in the direction of the engagement axis 130, the engagement axis being oriented in a plane parallel to the partition surface 32. In the configuration of FIGS. 28 and 29, the engagement axis 130 is "horizontal", being parallel to a bottom surface 144 of the container 116, the male engagement member 128$_M$ having straight counterparts of the protrusion 124 on opposite sides of the engagement axis 130 for slidably engaging corresponding counterparts of the depression 136 that form the female engagement member 128$_F$.

As shown in FIG. 29, lateral alignment of the container portions 124 is effected by a pair of detent members 146, designated male detent member 146$_M$ and female detent member 148$_F$. The male detent member 146$_M$ has a toe portion 148, a ramp portion 150 and a heel portion 152, the ramp portion 150 facilitating entry of the male detent member 146$_M$ into the female detent member 146$_F$ by a slight deformation of the container portions 124. The toe portion 148 and the heel portion 152 engage corresponding counterparts of the female detent member 146$_F$ for holding the container portions 124 in alignment. As shown in FIG. 28, the female engagement member 128$_F$ extends vertically proximate the associated plate assembly 50 for lateral support thereof. Similarly, the female detent member 146$_F$ extends proximate the neighboring plate assembly 50 for lateral support thereof, a vertically spaced pair of the detent members 146 providing lateral support proximate the top as well as the bottom of the plate assembly 50. Further, the engagement of the vertically spaced pair of the detent members 146 stiffens the structural connection between the container portions 124.

With further reference to FIG. 30, the connections between the facing partition portions 34 can be effected by a spaced pair of the dovetail-configured engagement members 128 for further enhancing the structural integrity of the container 116. In this configuration, there are four vertically spaced counterparts of the protrusion 134 that engage corresponding counterparts of the depression 136, providing a strength of engagement that is believed to be more than doubled over that of the configuration of FIG. 28, because the protrusions 134 and the depressions are more closely spaced, thereby stiffening the partition portions 34.

With further reference to FIG. 31, another and preferred configuration of the container 116 has a spaced pair of compound dovetail members $128_C$, the dovetail members $128_C$ each incorporating oppositely facing counterparts of the male and female engagement members $128_M$ and $128_F$. The dovetail members $128_C$ also function as a main dovetail member having a pair of main engagement surfaces 154 that extend on opposite sides of the partition surface 32. Lateral support of the plate assemblies 50 on opposite sides of the partitions surface 32 is provided by the female engagement members $128_F$, a vertically spaced pair thereof being located on each side of the partition surface 32. As further shown in FIG. 31, a pair of the female detent members $146_F$ are formed integrally with upper and lower ones of the male engagement members $128_M$.

With further reference to FIG. 32, the container 116 can be configured as a closed sequence of the container portions $124_C$, having the partition surfaces 32 radially extending from a common container axis 156. In FIG. 32, there are six of the container portions 124, although the container 116 can have any number of the portions 124, the container portions 124 being identically formable in a single cavity counterpart of the mold unit 114, designated mold 158. The mold 158 is configured for forming counterparts of the female engagement member $128_F$ in each container portion 124, the engagement axes 130 thereof being perpendicular to the parting surface 122, yet inclined relative to the partition surfaces 32. In the assembled container 116, counterparts of the plug engagement member 108 of FIG. 26, designated elbow member $128_E$, engage adjacent ones of the female engagement members $128_F$, the elbow members $128_E$ forming a pair of the male engagement members $128_M$ that intersect at an elbow angle E, the angle E corresponding to a partition angle P between the partition surfaces 32 for facilitating assembly of the container 116. The angles E and P are thus each 360° divided by the number of the container portions 124.

As shown in FIG. 32a, one end of the elbow member $128_E$ can have a counterpart of the thread member 142 for more securely holding the elbow member $128_E$ in threaded engagement with a counterpart of the threaded female engagement members $128_{FT}$ of one of the container portions 124 during disassembly of the container 116. If desired, the elbow member $128_E$ can be subsequently removed from the container portion 124, such as for use in a replacement container portion. As shown in FIG. 32a, the male engagement member $128_M$ is of reduced diameter, being offset outwardly from the container axis 156 for providing clearance whereby the elbow member $128_E$ can be threaded into the engagement member $128_{FT}$.

With further reference to FIGS. 33-35, the container 116 can have the engagement members 128 of the dovetail configuration oriented vertically, the engagement members 128 extending from the bottom surface 144 to respective shoulder surfaces 160, designated $160_M$ and $160_F$, that are spaced slightly below the neck region 20. The container portions 124 are held in vertical alignment by engagement against the shoulder surfaces 160, and by counterparts of the detent members 146 that are formed in the partition portions 34 above the shoulder surfaces 160. In the configuration of FIGS. 33-35, the detent members 146 are each formed as a button-shaped male detent member $146_M$ that snaps into a crater-shaped female detent member $146_F$. As shown in FIG. 34, a laterally spaced pair of the male detent members $146_M$ can be formed on the partition surface 34 for engaging a corresponding pair of the female detent members $146_F$ (not shown). It will be understood that the detent members $146_M$ and $146_F$ can be exchanged without altering the operation thereof.

With further reference to FIGS. 36 and 37, an alternative configuration of the container 116 for forming an attached configuration of the jar or bottle 80 of FIGS. 10-12, or the bottle 80' of FIGS. 16 and 17, has threaded counterparts of the engagement members $128_M$ and $128_F$ for threadingly engaging the container portions 124a and 124b on a single engagement axis 130. Counterparts of the detent members 146 are also formed in the partition portions 34 for holding the neck members 24' in alignment for engagement by the lid assembly 88 of FIGS. 13-15 (or the lid assembly 96 of FIGS. 16 and 17).

With further reference to FIGS. 38 and 39, a stacked counterpart of the container 116 has counterparts of the engagement members 128 aligned on a common engagement axis 130. As shown in FIG. 38, a first engagement member 162 forms a counterpart of the threaded female engagement member $128_{FT}$, providing a cap for sealingly threadingly closing a tubular counterpart of the container portion 124a, designated tube 164. The first engagement member 162 also has a counterpart of the female engagement member $128_F$ for releasably holding a first counterpart of the container portion 124c, designated first jar 166, by a counterpart of the male engagement member $128_M$ that forms a bottom extremity of the jar 166. A second engagement member 168, having another counterpart of the female engagement member $128_F$, also has another counterpart of the threaded female engagement member $128_{FT}$ for sealingly threadingly closing the first jar 166. Each of the threaded female engagement members $128_{FT}$ holds a counterpart of the gasket member 104 for effecting the sealed closure.

A second jar 170 is releasably supported by the second engagement member 168, being sealingly threadingly closed by a counterpart of the female engagement member $128_{FT}$ that downwardly extends from a counterpart of the container portion 124b, thereby forming a cap 172 for the second jar 170. The cap 172 is closed by a lid portion 174 thereof that is connected by a flexible hinge portion 176, the lid portion 174 also having a mirrored surface 178 that is exposed when the lid portion is opened. The cap 172 provides a shallow counterpart of the compartment 30 for holding a caked or powdered cosmetic 180, while a paste or similar product may be provided in the tube 164, creams, liquids or similar products being contained in the first and second jars 166 and 170. As further shown in FIG. 38, the first and second engagement members 162 and 168 are formed with counterparts of the depression 136 for engaging counterparts of the protrusion 134 that extend from counterparts of the male engagement members 128$_M$ that form lower extremities of the jars 166 and 170. For enhanced structural integrity, the first jar 166 has a pair of the protrusions 134 that engage corresponding ones of the depressions 136 of the first engagement member 162.

An important feature of the container 116 of FIGS. 38 and 39 is that counterparts of the fastener members 138 are provided within the first and second engagement members 162 and 168, the fastener members 138 serving to hold the male and female engagement members 128$_M$ and 128$_F$ axially engaged as described above. More importantly, the fastener members hold the jars 166 and 170 in a desired rotational alignment with the corresponding engagement members. Thus labels or other indicia can be formed on the jars 166 and 170 without regard to the tightened position of the engagement members 162 and 168 or the tube 164 and the first jar 166, yet the jars 166 and 170 can be snapped into the respective engagement members 162 and 168 in any desired orientation, the resulting engagement between the fastener members 138$_H$ and 138$_L$ effectively holding the desired orientation, even during opening and closing of the tube 164 and the jars 166 and 170.

As shown in FIG. 39, a trademark or other name 182 is formed on an upper surface 184 of the first engagement member 162, the name 182 being visible through an opening 186 in the fastener member 138 that is affixed within the female engagement member 128$_F$ of the first engagement member 162.

In the modular or attached configurations of the container 116 described above in connection with FIGS. 21-39, the container portions 124 are separable for selective use of fewer than all of the container portions 124, and for replacement of one or more of the portions 124 such as when product contained therein has been used up. In the configurations of FIGS. 21-37, the holding means 132 can also include a suitable adhesive or bonding agent such as an epoxy resin, the adhesive can be used at the partition surface 32 between the facing partition portions 34, as well as or instead of between engaged engagement members 128 for permanently connecting the container portions 124. The present invention facilitates use of the adhesive in that the protrusions 134 and/or the fastener members 138 serve to hold the container portions 124 in proper alignment while the adhesive sets. Thus machinery that joins the container portions following application of the adhesive can immediately release the assembled containers 116 before the adhesive sets, thereby increasing production.

With further reference to FIG. 40, an additional configuration of the container 116 has counterparts of the compartments 30 stacked vertically as in FIG. 20a. In the configuration of FIG. 40, there are a pair of end container portions, designated 188a, that correspond generally to the portions 124b of FIGS. 33-35, and a central container portion 188b having an oppositely projecting pair of the male engagement members 128$_M$, the engagement members 128 having a dovetail configuration similar to that shown in FIGS. 33-35. A counterpart of the first supporting surface 113a is formed in at least one of the end container portions 188a, a counterpart of the second supporting surface 113b being formed opposite the neck members 24 of the container portions 188 as discussed above in connection with FIG. 20a. Counterparts of the male shoulder surface 160$_M$ are formed as extensions of a neck shoulder surface 190b of the container portion 188b, the neck member 24b having an enlarged recessed configuration relative to the neck members 24a generally corresponding to the neck member 24c of FIG. 20a. Counterparts of the detent members 146 are provided adjacent to the engagement members 128, the male engagement members 128$_M$ of the center container portion 188b being foreshortened from the second supporting surface 113b for facilitating engagement and disengagement of the detent members 146 by slight flexing of the container portions 188.

Although the present invention has been described in considerable detail with reference to certain preferred versions thereof, other versions are possible. For example, the first-molded portions 110 in FIGS. 19 and 20 can serve in place of the partition members 28 as mold surfaces against which the last-molded portions 112 are molded. In this case, the material for the last-molded portions 112 is selected for a slightly reduced melting temperature than that of the first-molded portions 110. Also, the configuration of FIGS. 32 and 32a can have unequally sized container portions 124. Further, the configuration of FIGS. 32 and 32a can be extended to include an open string of the container portions 124. Moreover, the configurations of FIGS. 21-14, 33-35, 38 and 39, and 40, can have one or more of the male and female engagement members 128$_M$ and 128$_F$ interchanged. The bottom container portion 124a can be another of the jars 166 or 170, the engagement member 162 being replaced by the engagement member 168. The engagement member 168 can also be provided with the name 182 that is visible when the upper portions of the container 116 are detached. Therefore, the spirit and scope of the appended claims should not necessarily be limited to the description of the preferred versions contained herein.

What is claimed is:

1. A modular multiple compartment blow-molded container comprising:
   (a) a molded plastic material forming walls of a first compartment of the container, the first compartment having a neck opening, at least one of the walls having an outwardly facing first cavity member connected thereto, the first cavity member defining a first cavity axis;
   (b) a molded plastic material forming walls of a second compartment of the container, the second compartment having a neck opening, at least one of the walls having means for supporting an exterior first boss member in protruding relation thereto for locational engagement with the first cavity member of the first compartment, the first boss member defining a first boss axis, the first boss axis being parallel and concentric with the first cavity axis;
   (c) spacing means for holding the first cavity member at a predetermined axial position and fixed angular orientation relative to the first boss member, the spacing means comprising respective engagement surfaces fixedly located on each of the first and second compartments for releasably preventing disengagement of the compartments in a direction parallel to the first cavity axis; and
   (d) index means for fixing the angular orientation about the first cavity and boss axes, the index means comprising a detent member on one of the first and second compartments, the detent member biasingly engaging a detent cavity on the other compartment.

2. A modular multiple compartment blow-molded container comprising:
(a) a molded plastic material forming walls of a first compartment of the container, the first compartment having a neck opening, at least one of the walls having an outwardly facing first cavity member connected thereto, the first cavity member defining a first cavity axis;
(b) a molded plastic material forming walls of a second compartment of the container, the second compartment having a neck opening, at least one of the walls having means for supporting an exterior first boss member in protruding relation thereto for locational engagement with the first cavity member of the first compartment, the first boss member defining a first boss axis, the first boss axis being parallel and concentric with the first cavity axis;
(c) spacing means for holding the first cavity member at a predetermined axial position and fixed angular orientation relative to the first boss member, the spacing means comprising respective engagement surfaces fixedly located on each of the first and second compartments for releasably preventing disengagement of the compartments in a direction parallel to the first cavity axis,
wherein the first boss and cavity axes are parallel to the respective container walls, the first boss member having dovetail parallel sliding engagement with the first cavity member on the first cavity axis along a major portion of the first cavity member, and wherein the first cavity and boss axes are parallel to respective bottom walls of the compartments for permitting each of the compartments to be supported by the other compartment without loading the spacing means in a direction parallel to the first cavity and boss axes.

3. A modular multiple compartment blow-molded container comprising:
(a) a molded plastic material forming walls of a first compartment of the container, the first compartment having a neck opening, at least one of the walls having an outwardly facing first cavity member connected thereto, the first cavity member defining a first cavity axis;
(b) a molded plastic material forming walls of a second compartment of the container, the second compartment having a neck opening, the first and second compartments having respective coplanar bottom walls, at least one of the walls having means for supporting an exterior first boss member in protruding relation thereto for locational engagement with the first cavity member of the first compartment, the first boss member defining a first boss axis, the first boss axis being parallel and concentric with the first cavity axis;
(c) spacing means for holding the first cavity member at a predetermined axial position and fixed angular orientation relative to the first boss member, the spacing means comprising respective engagement surfaces fixedly located on each of the first and second compartments for releasably preventing disengagement of the compartments in a direction parallel to the first cavity axis,
wherein the first boss and cavity axes are parallel to the respective container walls, the first boss member having dovetail parallel sliding engagement with the first cavity member on the first cavity axis along a major portion of the first cavity member.

4. The container of claim 3, wherein the respective bottom walls define end extremities of the corresponding first cavity member and first boss member.

5. A modular multiple compartment container comprising:
(a) a molded plastic material forming walls of a first compartment of the container, at least one of the walls having an outwardly facing first cavity member connected thereto, the first cavity member defining a first cavity axis;
(b) a molded plastic material forming walls of a second compartment of the container, at least one of the walls having means for supporting an exterior first boss member in protruding relation thereto for locational engagement with the first cavity member of the first compartment, the first boss member defining a first boss axis, the first boss axis being parallel and concentric with the first cavity axis;
(c) spacing means for holding the first cavity member at a predetermined axial position and at a fixed angular orientation relative to the first boss member, comprising:
(i) a first fastener member fixedly connected to a floor portion within the first cavity member; and
(ii) a second fastener member fixedly connected to an end portion of the first boss member, the fastener members releasably holding the first boss member in engagement with the first cavity member.

6. The container of claim 5, wherein the spacing means provides a plurality of angular orientations of the first cavity member relative to the first boss member.

7. The container of claim 6, wherein the fastener members are a mating pair of hook-loop fasteners.

8. The container of claim 5, wherein the spacing means provides a single predetermined angular orientation of the first cavity member relative to the first boss member.

9. A modular multiple compartment container comprising:
(a) a molded plastic material forming walls of a first compartment of the container, at least one of the walls having an outwardly facing first cavity member connected thereto, the first cavity member defining a first cavity axis;
(b) a molded plastic material forming walls of a second compartment of the container, at least one of the walls having a first boss cavity for supporting a first boss member in protruding relation thereto for locational engagement with the first cavity member of the first compartment, the first boss member defining a first boss axis, the first boss axis being parallel and concentric with the first cavity axis; and
(c) spacing means for holding the first cavity member at a predetermined axial position relative to the first boss member, comprising respective engagement surfaces fixedly located on the first cavity member and the first boss member for releasably preventing disengagement of the compartments in a direction parallel to the first cavity axis, wherein the first boss member is connected to the side wall of the second container by engagement with a boss cavity in the side wall.

10. The container of claim 9, wherein the first boss member threadingly engages the boss cavity.

11. The container of claim 9, wherein the first boss member includes a snap engagement portion outwardly extending therefrom for holding the first boss member in rigid engagement with the boss cavity in the side wall.

12. A modular multiple compartment container comprising:
   (a) a molded plastic material forming walls of a first compartment of the container, at least one of the walls forming a threaded neck portion of the first compartment, the neck portion having a neck opening and defining a neck axis of the first compartment;
   (b) a molded plastic material forming walls of a second compartment of the container, and a coupling engagement surface external to the compartment, the coupling engagement surface defining a coupling axis;
   (c) a coupling member for releasably engaging the coupling engagement surface and threadingly engaging the neck portion, the neck axis being concentric with the coupling axis, the neck opening of the first compartment being sealingly closed by the threaded engagement of the coupling member with the neck portion; and
   (d) means for releasably locking the coupling member to the coupling engagement surface of the second compartment in a selected angular orientation about the coupling axis,
   whereby the second compartment has a desired orientation relative to the first compartment when joined thereto by the coupling member, with the first compartment sealingly closed by the coupling member.

13. The container of claim 12, wherein the means for releasably locking the coupling member comprises:
   (a) a first fastener member fixedly connected to a floor portion of the coupling member; and
   (b) a second fastener member fixedly connected to an end portion of the second compartment, the fastener members releasably holding the second compartment in engagement with the coupling member.

14. The container of claim 13, wherein one of the fastener members is a multiple hook member, and the other fastener member is a multiple loop member, the hook members releasably engaging the loop members.

15. The container of claim 12, wherein the coupling member includes a coupling cavity portion, and the coupling engagement surface forming a boss portion of the second compartment, the boss portion axially engaging the coupling cavity portion of the first compartment.

16. A modular multiple compartment container comprising:
   (a) a molded plastic material forming walls of a first compartment of the container, at least one of the walls having an outwardly facing first cavity member connected thereto, the first cavity member defining a first cavity axis;
   (b) a molded plastic material forming walls of a second compartment of the container, at least one of the walls having means for supporting an exterior first boss member in protruding relation thereto for locational engagement with the first cavity member of the first compartment, the first boss member defining a first boss axis, the first boss axis being parallel and concentric with the first cavity axis; and
   (c) spacing means for holding the first cavity member at a predetermined axial position and angular orientation relative to the first boss member, comprising a radially protruding portion of the first boss member, the protruding portion engaging the first cavity for holding the first boss member within the first cavity.

17. The container of claim 16, wherein the first cavity axis is perpendicular to the one wall of the first compartment, and the first boss axis is perpendicular to the one wall of the second compartment.

18. The container of claim 16, wherein the respective container walls are in contact at the predetermined axial position.

19. The container of claim 16, wherein the respective container walls are side walls of the corresponding first and second compartments.

20. The container of claim 19, wherein the spacing means comprises shear adhesive means for preventing sliding contact between the side walls of the first and second compartments.

21. The container of claim 16, wherein the first boss member is integrally with the second compartment.

22. The container of claim 16, wherein the radially protruding portion of the first boss member is a ring portion, the ring portion engaging the first cavity for holding the first boss member within the first cavity.

23. The container of claim 16, wherein the radially protruding portion of the first boss member is a thread member, the thread member threadingly engaging the first cavity member.

24. The container of claim 16, wherein the one wall of the second compartment has an outwardly facing second cavity member connected thereto, the second cavity member defining a second cavity axis parallel to the first boss axis, and
   wherein the one wall of the first compartment has an exterior second boss member protruding therefrom for locational engagement with the second cavity member of the second compartment, the second boss member defining a second boss axis parallel to the first cavity axis, the second boss axis being concentric with the second cavity axis, engagement of the boss members with the corresponding cavity members providing the predetermined angular orientation of the first cavity member relative to the first boss member.

25. The container of claim 16, further comprising means for selectively holding the first boss member engaged with the first boss cavity member in a selected angular orientation about the first cavity axis.

26. A multi-celled battery comprising:
   (a) a plurality of horizontally adjacent cell units, each cell unit comprising:
      (i) a blow molded necked compartment having a top neck opening, a bottom wall and nominally vertical side walls, an annular neck discontinuity being located proximate the neck opening;
      (ii) a cell plate unit in the compartment and having a pair of parallel upstanding conductive terminal members for conducting electrical current to and from the plate unit;
      (iii) a cover member sealingly engaging the neck discontinuity, the terminal members sealingly protruding the cover member;

(b) means for rigidly connecting the compartments of each cell unit with the bottom walls in coplanar relation, comprising mating horizontally parallel dovetail portions of contacting adjacent side walls of the compartments, the dovetail portions extending substantially to adjoining side walls of the respective compartments for supportive connection between the adjacent cell units without loading the dovetail portions in a direction tending to produce sliding disengagement of the dovetail portions;

(c) means for releasably preventing sliding disengagement of the dovetail portions; and (d) bus means external to the compartments for serially connecting at least some of the plate means by the terminal members.

27. The battery of claim 26, wherein each of the compartments is formed to include an external lid discontinuity portion, the discontinuity portions collectively forming a lid discontinuity surrounding the neck openings, the battery further comprising a lid member retained by the lid discontinuity, the lid member covering the bus means and the cover members, an end pair of the terminal members protruding the lid member.

28. The container of claim 26, wherein the means for preventing disengagement comprises a detent member on one of the first and second compartments, the detent member biasingly engaging a detent cavity on the other compartment, the detent member being spaced from the other compartment throughout a major portion of the sliding engagement for facilitating engagement and disengagement of the compartments.

29. The container of claim 26, wherein the means for preventing disengagement comprises shear adhesive means for preventing sliding contact between the side walls of the first and second compartments.

30. The battery of claim 26, wherein the bus means comprises a conductive strap member connecting one of the terminal members of neighboring cell plate means.

31. The container of claim 26, wherein each cover member sealingly grips at least one annular neck discontinuity of the corresponding neck opening.

32. A modular multiple compartment container comprising:

(a) a molded plastic material forming walls of a first compartment of the container, the first compartment having a neck opening defining a first neck axis;

(b) a molded plastic material forming walls of a second compartment of the container, bottom and adjacent side walls of the second compartment defining a second compartment axis;

(c) a coupling member for connecting the compartments with the first neck axis concentric with the second compartment axis, the coupling member threadingly engaging the first compartment for sealingly closing the neck opening thereof, the coupling member axially engaging the second compartment in selectable angular orientations therewith; and (d) means for holding the coupling member axially engaged with the second compartment while preventing angular movement between the second compartment and the coupling member.

33. The container of claim 32, wherein the bottom and adjacent side walls of the second compartment form a boss portion of the second compartment, the coupling member having a cavity portion for mating with the boss portion.

34. The container of claim 32, wherein the means for holding the coupling member comprises a mating pair of hook-loop fastener members connected between the second compartment and the coupling member.

* * * * *